July 2, 1957   J. P. ECKERT, JR   2,798,169
TRANSISTOR-MAGNETIC AMPLIFIER BISTABLE DEVICES
Filed Aug. 6, 1954   6 Sheets-Sheet 1
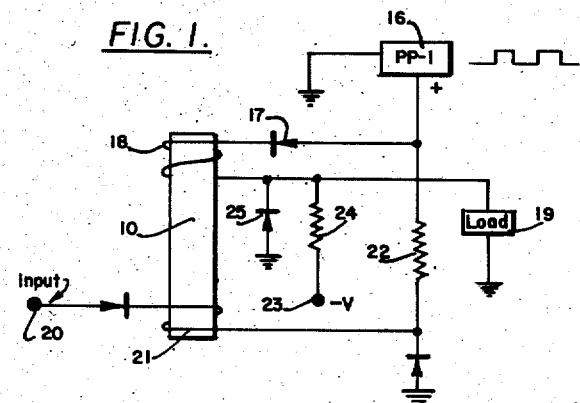
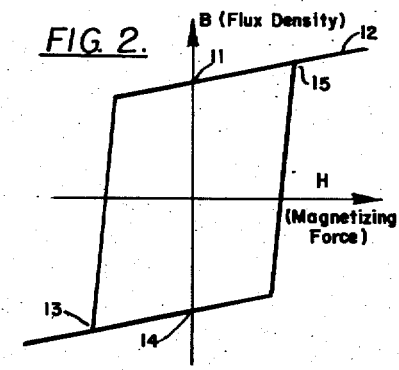
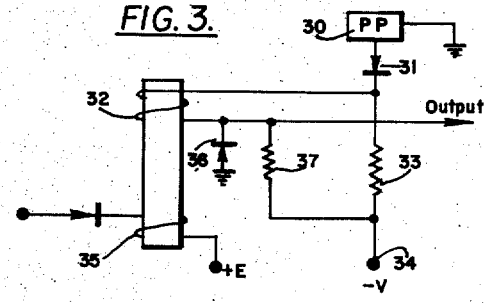
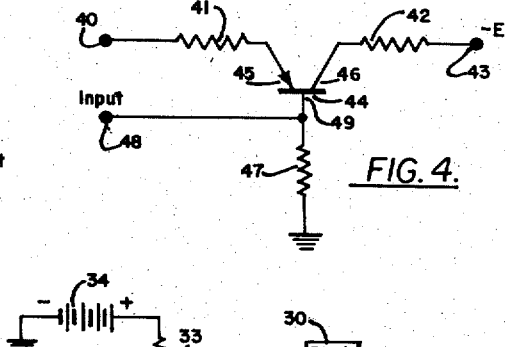
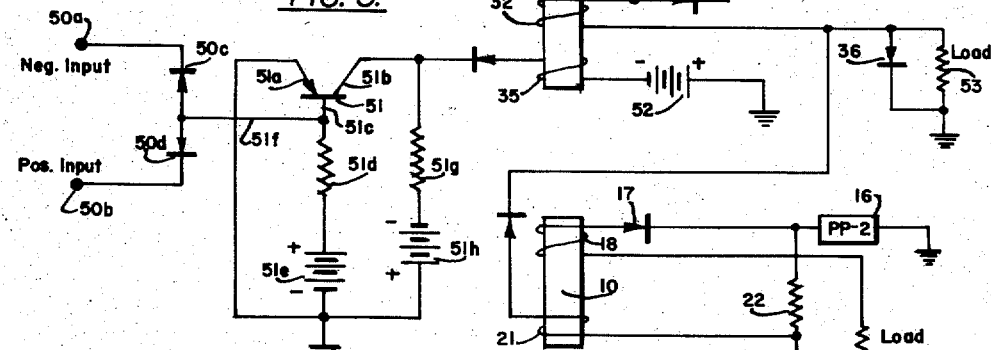
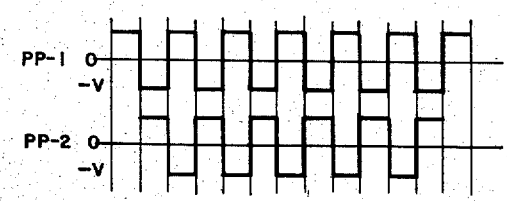
INVENTOR
JOHN PRESPER ECKERT, JR.
BY
ATTORNEY July 2, 1957   J. P. ECKERT, JR   2,798,169
TRANSISTOR-MAGNETIC AMPLIFIER BISTABLE DEVICES
Filed Aug. 6, 1954   6 Sheets-Sheet 2

INVENTOR
JOHN PRESPER ECKERT, JR.
BY
ATTORNEY

July 2, 1957  J. P. ECKERT, JR  2,798,169
TRANSISTOR-MAGNETIC AMPLIFIER BISTABLE DEVICES
Filed Aug. 6, 1954  6 Sheets-Sheet 3

INVENTOR
JOHN PRESPER ECKERT, JR.
BY
ATTORNEY

July 2, 1957     J. P. ECKERT, JR     2,798,169
TRANSISTOR-MAGNETIC AMPLIFIER BISTABLE DEVICES
Filed Aug. 6, 1954     6 Sheets-Sheet 4
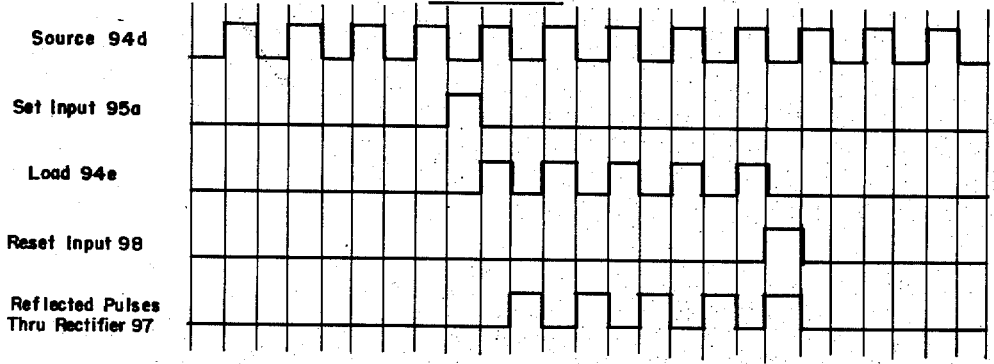
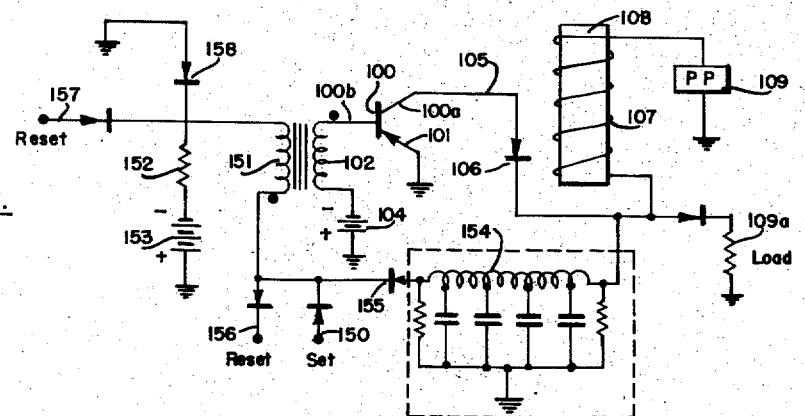
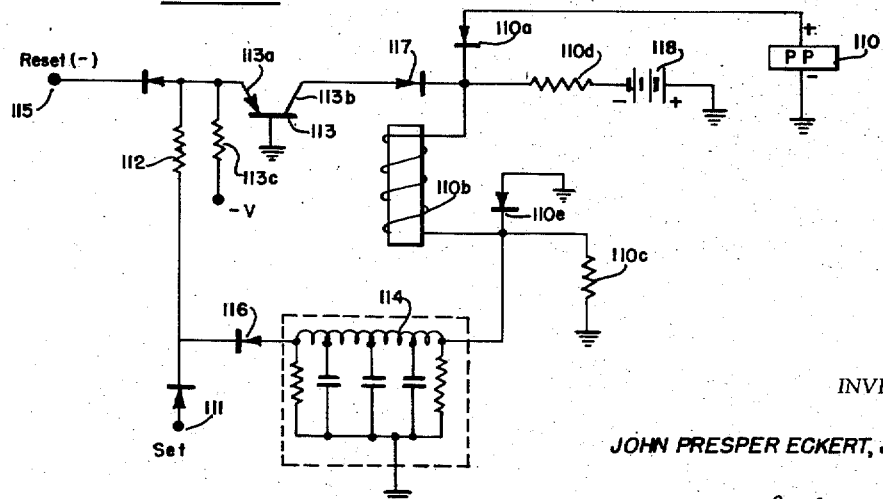
INVENTOR
JOHN PRESPER ECKERT, JR.
ATTORNEY July 2, 1957 J. P. ECKERT, JR 2,798,169
TRANSISTOR-MAGNETIC AMPLIFIER BISTABLE DEVICES
Filed Aug. 6, 1954 6 Sheets-Sheet 5
FIG. 12.
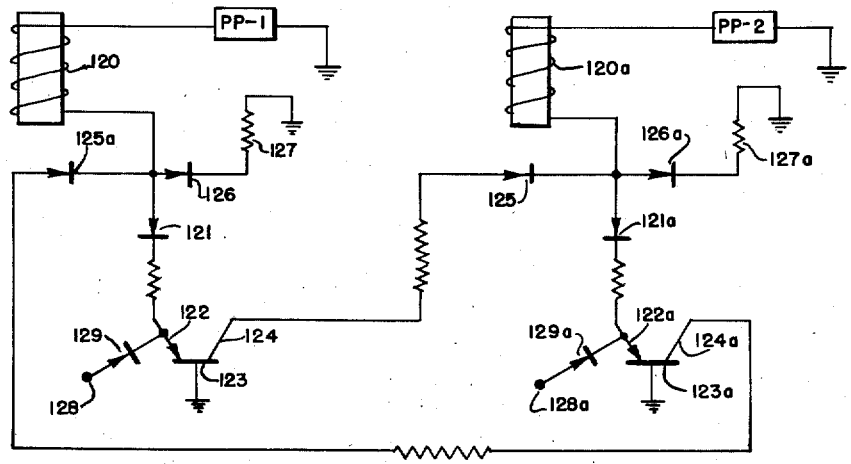
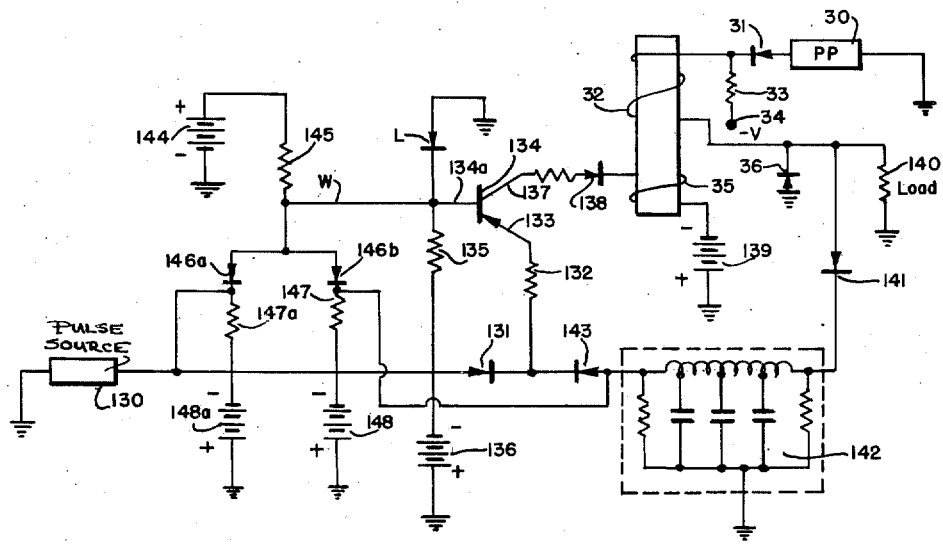
FIG. 13.
INVENTOR
JOHN PRESPER ECKERT, JR.
BY
ATTORNEY

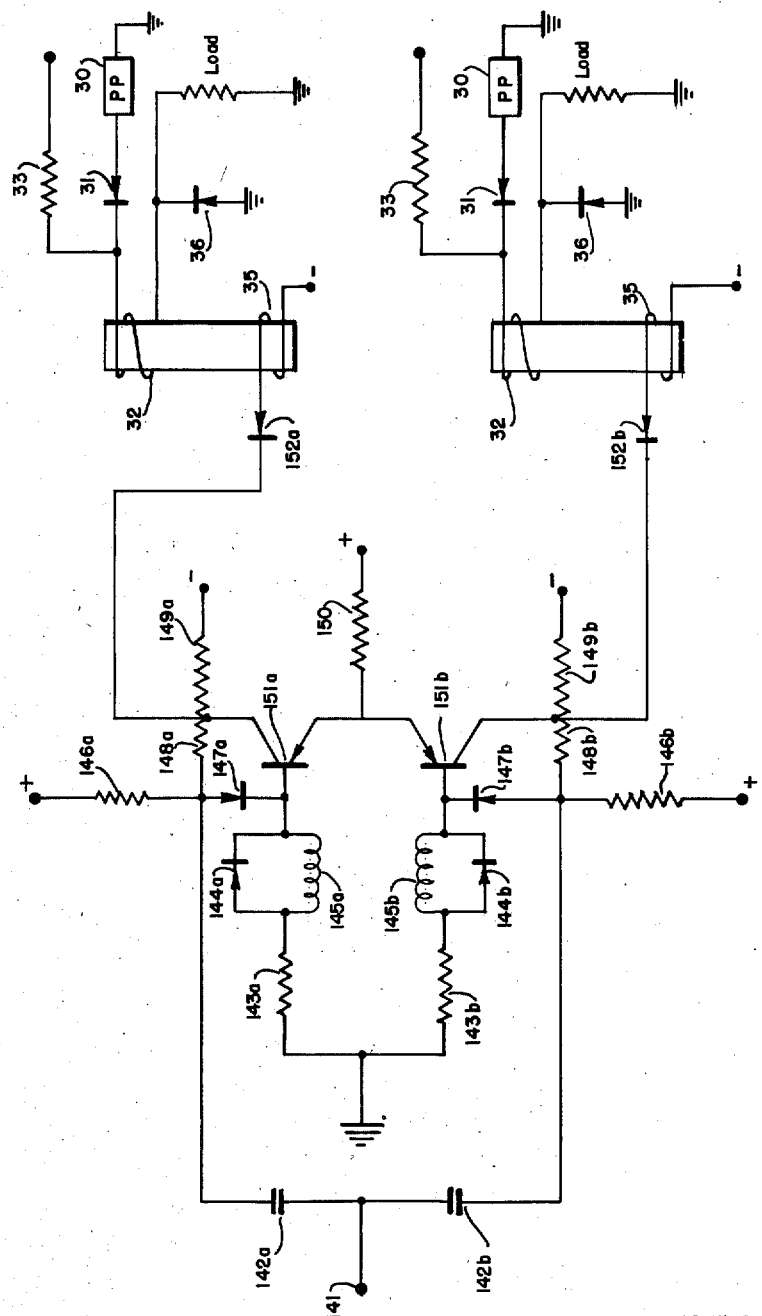

United States Patent Office 2,798,169
Patented July 2, 1957

2,798,169

TRANSISTOR-MAGNETIC AMPLIFIER BISTABLE DEVICES

John Presper Eckert, Jr., Philadelphia, Pa., assignor to Sperry Rand Corporation, a corporation of Delaware Application August 6, 1954, Serial No. 448,207

35 Claims. (Cl. 307—88)

This invention relates to bistable devices and more particularly to those utilizing transistors. The transistor is limited in possible current gain but has potential ability to achieve a large voltage gain. It is, however, not inherently pulse-forming as in the pulse type magnetic amplifier. The magnetic amplifier requires more than one winding (or a tap winding) to produce voltage gain but is inherently capable of high current gain. The combination of these two devices (the transistor and the magnetic amplifier) shows virtues which neither alone possesses.

It is a primary object of this invention to improve the operation of a transistor bistable device.

It is a further object of the invention to provide a transistor bistable device with a high current gain.

A further object of the invention is to provide a transistor bistable device, without the disadvantages inherent in such devices as they exist at present, and with the advantages inherent in magnetic amplifier bistable devices.

A further object of the invention is to provide a simple bistable device that is low in cost and effective in operation.

Still another object of the invention is to provide a transistor bistable circuit with means for timing and/or shaping the output thereof.

Another object of the invention is to provide a transistor bistable circuit with a large output.

In addition, it is an object of the invention to provide a transistor bistable circuit in which an uninterrupted train of output pulses represents one stable state; the other stable state being represented by some other output condition such as no current at all.

Yet another object of the invention is to provide a bistable device without component parts that are likely to burn out.

Briefly speaking, the invention employs a transistor type of bistable device so combined with one or more magnetic amplifiers as to have the advantages of both of these types of apparatus.

In the drawings:

Figure 1 is a schematic diagram of a complementing magnetic amplifier used in some of the forms of this invention.

Figure 2 is a hysteresis loop of the core materials used in the magnetic amplifiers of this invention.

Figure 3 is a schematic diagram of a non-complementing magnetic amplifier of the type which, in combination with other elements, may be used in conjunction with this invention.

Figure 4 is a schematic diagram of a transistor bistable device, already known in the prior art.

Figure 5 is a schematic diagram of one form of this invention.

Figure 5A is a waveform diagram showing the relation of pulses of the two sources 16 and 30 of Figure 5.

Figure 9A is a timing diagram of the apparatus of Figure 9.

Figure 10 is a schematic diagram of still another form of the invention.

Figure 11 is a modified form of an additional form of the invention.

Figure 12 is a schematic diagram of an additional form of the invention.

Figure 13 is a schematic diagram of still another form of the invention.

Figure 14 is a schematic diagram of a modified form of the invention.

Figure 6:
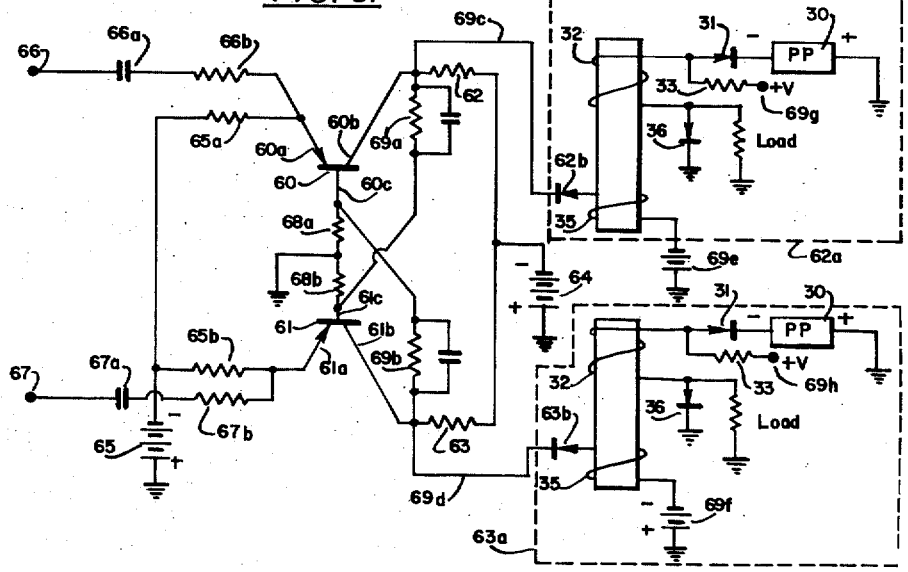
Figure 6 is a schematic diagram of a modified form of the invention.

The present application uses magnetic amplifiers of the general types described in the following two applications: Theodore H. Bonn and Robert D. Torrey, Serial No. 402,858, filed January 8, 1954, entitled "Signal Translating Device"; and John Presper Eckert, Jr. and Theodore H. Bonn, Serial No. 382,180, filed September 24, 1953, entitled "Signal Translating Device." These applications are assigned to the same assignee as the present application. However, in order to lay a basis in this application for a discussion of magnetic amplifiers, there will now be described a simple complementing magnetic amplifier as shown in Figure 1; and later a simple non-complementing magnetic amplifier as shown in Figure 3 hereof.

Figure 1 is a schematic diagram of one type of magnetic amplifier that may be used in connection with the invention. The magnetic core 10 may be made of a variety of materials, among which are the various types of ferrites and the various magnetic tapes, including Orthonik and 4–79 Moly-permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high.

In Figure 1 the source 16 of power pulses PP–1 generates a train of equally spaced square wave pulses. If it be assumed that at the beginning of any given pulse the core has residual magnetism and flux density as represented on point 11 of the hysteresis loop of Figure 2, the power pulse will drive the core from point 11 to saturation point 12. At the conclusion of the pulse the magnetization will return to point 11. Successive pulses from power source 16 will flow through rectifier 17, coil 18 and load 19, repeatedly driving the core from remanence point 11 to saturation point 12. During the interval in which the core is being driven from 11 to 12, the core is operating on a relatively saturated portion of the hysteresis loop, whereby the impedance of coil 18 is low. Hence the power pulses will flow from source 16 to load 19 without substantial impedance. If, however, during the interval between two power pulses, a pulse is received at the input 20, it will pass through coil 21, resistor 22, source 16, to ground. This will magnetize the core negatively driving it from point 11 to point 13. At the conclusion of this negative pulse the core will return to remanence point 14. The next power pulse from source 16 is just sufficient to drive the core from point 14 to point 15. Since this is a relatively unsaturated portion of the hysteresis loop, the coil 18 will have high impedance during this pulse and the current flow will be very low. At the conclusion of that pulse the magnetization will return to zero value 11. If no signal appears on the input immediately following the last-named power pulse, the next power pulse will drive the core to saturation at point 12 and will give a large output at the load 19.

Consequently, it is clear that the magnetic amplifier of Figure 1 will feed large pulses to the load in response to each pulse from source 16, except that immediately after the receipt of any pulse on the input 20 the next power pulse will be blocked. This type of a magnetic amplifier is known as a "complementing" one.

In order to avoid appearance at the load 19 of the small current which flows during the period that a power pulse is driving the core from point 14 to point 15, the parts 23, 24 and 25 may be employed. The negative source 23 passes a current greater than the said small current through resistor 24 and rectifier 25. Thus in the presence of the said small current, there is a net current in diode 25, and the cathode of 25 therefore remains substantially at ground potential.

The non-complementing magnetic amplifier of Figure 3 will now be described, as follows:

The power pulses from source 30 are positive as in the previous case and pass through rectifier 31, coil 32, resistor 37, to negative pole 34 which is below ground potential. If we assume that at the start of the first pulse the core was at point 14 on its hysteresis loop (see Figure 2), it will be driven to point 15. At the end of this pulse, it will return to zero value 11. At the conclusion of the first pulse, current will flow in the following circuit: from ground to rectifier 36, coil 32, resistor 33 to negative pole 34. This is a current flow through coil 32 in the opposite direction from that of the first pulse and drives the core negatively from point 11 to point 13. At the conclusion of this reverse pulse, the second power pulse will again drive the core positively from point 13 through point 14 to point 15, and from thence it will go to 11, after the conclusion of the second pulse. The next action will be another flow of current in the following circuit: from ground, rectifier 36, coil 32, resistor 33, to negative pole 34. Hence, the magnetization of the core will repeatedly traverse the hysteresis loop and the majority of the time the core will be operating on unsaturated portions of the hysteresis loop, consequently there will be substantially no output. If, however, an input signal is received in coil 35, at a time when the core is at point 11, the reverse current (in circuit: ground 36—32—33—34) will not drive the core negatively to point 13 as usual. In such situation, there will be two opposite magnetizing forces on the core. On the one hand there will be a flow of current in the circuit: ground to rectifier 36, coil 32, resistor 33, to negative pole 34, tending to apply a negative magnetizing force to the core. There will be an additional input current in coil 35 tending to apply a positive magnetizing force to the core. These two magnetizing forces will cancel each other and the core will remain at point 11 on the hysteresis loop. Consequently, the next power pulse will pass through rectifier 31 and coil 32 to the output. It will drive the core from point 11 to point 12 on the hysteresis loop. The core is substantially saturated throughout this entire period, and therefore a large pulse output will appear. The operation of the non-complementing amplifier may be summarized by stating that there will be current that will drive the core around the hysteresis loop without substantial saturation and therefore without any substantial pulse output until there is a current flow through coil 35. This will stop the alternating magnetizations of the core, allowing the next power pulse to saturate the core and give a large output.

For basic information on transistors and certain applications thereof, reference is made to the following United States patents: John Bardeen and Walter H. Brattain, No. 2,617,865, November 11, 1952, Semiconductor Amplifier and Electrode Structures Therefor; Reymond J. Kircher, No. 2,623,103, December 23, 1952, Semiconductor Signal Translating Device; Gustav Bergson, No. 2,660,624, November 24, 1953, High Input Impedance Semiconductor Amplifier; Bernard N. Slade, No. 2,666,873, January 19, 1954, High Current Gain Semiconductor Device.

Briefly speaking, the transistor bistable device shown in Figure 4 employs a germanium crystal 44 having an emitter electrode 45 and a collector electrode 46. The base electrode of the crystal is grounded through resistor 47. Since terminal 43 is negative, no current will tend to flow from it to ground at the start since the rectifier 46—49 has the wrong polarity for such a current flow.

If, however, positive potential is applied at input 40, current may flow through resistor 41, emitter electrode 45, crystal 44, base electrode 49, and resistor 47 to ground. This will cause such a change in the crystal 44 that current will now flow to the negative pole 43, through resistor 42. This current is of sufficient magnitude so that the drop in resistor 47 will cause base electrode 49 and crystal 44 to assume a potential below ground. If then the potential of input terminal 40 is reduced to ground, it will still be more positive than crystal 44, and therefore a current will flow from 40 through resistor 41, emitter 45 to crystal 44—a condition which (as explained above) permits the continuance of current flow from ground through resistor 47, base connection 49, crystal 44, collector 46, resistor 42 to negative pole 43. Hence, a continuous flow of direct current will pass through resistor 42 and if this resistor has very high resistance, the potential developed across it and the power available from it will be high compared to the input power. Hence, the device has a first stable state in which current is continuously flowing through resistor 42. If then a positive potential is applied to input 48 the device will flip to another stable state in which the upper end of resistor 47 is at or above ground, and the current in resistor 42 is then stopped. It will remain in that stable state until another negative input pulse on input 48 (or a positive input at 40) flips the device back to the first stable state.

The circuit of Figure 5 illustrates a combination of a transistor bistable device and a magnetic amplifier. The negative input 50a feeds negative pulses through rectifier 50c and wire 51f to base electrode 51c of the crystal 51. This negative potential reduces the potential of crystal 51 below ground, so that a current flows from emitter 51a, which is at ground, into crystal 51, permitting flow of current from crystal 51 to collector 51b, and partly through resistor 51g and potential source 51h, partly through coil 35 and potential source 52, to ground, thence partly through emitter 51a, partly through potential source 51e, resistor 51d, and base connection 51c back to crystal 51, completing the circuit. Hence, a current now flows in the coil 35 of the non-complementing amplifier which is represented by reference numbers 30 to 36 inclusive. The devices identified by these reference numbers correspond to like devices bearing like reference numbers in Figure 3. The only difference between the non-complementing amplifier of Figure 5 and that of Figure 3 is that the polarities of the operating potentials are all reversed; but this of course does not change the mode of operation of the device. Any current flowing in the coil 35 between the power pulses of source 30 will prevent resetting of the core by battery 34. This follows from the fact that in the absence of a current in coil 35 the core would be reset by current flowing from battery 34, resistor 33, coil 32, rectifier 36 to ground. Hence the next power pulse could not drive the core to saturation. On the other hand, if a current is flowing through coil 35 during the spaces between power pulses, the current flow from battery 34 through coil 32 will set up a magnetizing force which is equalized by that set up by coil 35 and the core will not be reset. Hence, successive power pulses from source 30 through the load 53 will drive the core to saturation and give an uninterrupted train of output pulses. The parts 16 to 22 inclusive form a complementing amplifier the same as similarly numbered parts of Figure 1 form the complementing amplifier of that figure.

As shown in Figure 5A, the negative going pulses of source 16 occur during the spaces between the negative going pulses of source 30, the pulses and the spaces between them in both cases being substantially equal. The output of the noncomplementing magnetic amplifier is fed through the coil 21 of the complementing amplifier. In the absence of any output from the non-complementing magnetic amplifier, the complementing amplifier will produce an uninterrupted train of output pulses from source 16 at the load 19. In the event a pulse flows from the non-complementing amplifier to and through the coil 21, the core 10 will be reset during the spaces between power pluses 16 and there will be no pulse output at the load as long as there continue to be pulses through coil 21. Hence, to summarize the operation which follows the appearance of a negative pulse at input 50a, it is noted that there will appear an uninterrupted train of pulses at load 53, and a cessation of the train of pulses at the load 19. If now we assume that a positive pulse appears at input 50b, it will pass through rectifier 50d and render the base 51c of the crystal 51 positive, thus cutting off the flow of triggering current through emitter electrode 51a. Hence, a flow of current through collector electrode 51b will stop and current in coil 35 will stop; therefore current at the load 53 will stop and there will be no current flow in coil 21. Hence there will be an uninterrupted train of power pulses flowing from source 16 to the load 19. It follows, therefore, that in response to each alternate energization of the two inputs 50a and 50b, there will be a single uninterrupted train of pulses appearing at the load 53 and another single uninterrupted train of pulses appearing at a different time at the load 19. This operation may be utilized by one skilled in the art for purposes of a bistable device or a computer counting circuit.

Figure 6 is a modified form of the invention in which there is a flip-flop circuit basically similar to the well known Eccles-Jordan flip-flop circuit. However, transistors 60 and 61 are substituted for the triodes normally employed in the Eccles-Jordan circuit. There are two inputs 66 and 67 which respectively feed the emitter electrodes 60a and 61a of the transistors 60 and 61 through condensers 66a and 67a and resistors 66b and 67b. The emitter electrodes 60a and 61a of the transistors 60 and 61 are biased negatively by battery 65 through resistors 65a and 65b. Consequently normally the emitter electrodes are cut off and pass no current. The base electrodes 60c and 61c of the transistors are grounded through resistors 68a and 68b. The collector electrodes 60b and 61b are connected through resistors 62 and 63 to the negative pole of battery 64. These two resistors have high resistance and therefore develop a considerable voltage drop when their respective transistors are in a conducting state. Feedback is provided from the output of one transistor to the control electrode of the other transistor through resistors 69a and 69b and their associated capacitors connected in the usual fashion for this type of flip-flop circuit. Connected to the outputs of the flip-flop circuit itself, are wires 69c and 69d.

If we assume that at the start of the apparatus the upper transistor 60 is in a conducting state and the lower one 61 is in a non-conducting state, it is apparent that there is a current flowing through resistor 62 to battery 64 and consequently the wire 69c is near to ground potential. This wire is connected through resistor 69a to the base electrode 61c of transistor 61 and therefore causes this base electrode 61c to be near to ground potential. Since the battery 65 holds the emitter electrode 61a at a slightly negative potential, there is no current flow from the emitter electrode 61a to the base electrode 61c and consequently the transistor 61 is cut off. This being the case, the full potential of battery 64 appears upon wire 69d and current therefore flows from ground through battery 69f and coil 35 to wire 69d. Since the battery 69f has only a small negative potential compared to the large negative potential of battery 64, there will be a substantial current flow in coil 35 which will neutralize the magnetizing force produced in coil 32 by the current flowing from positive pole 69h through resistor 33, coil 32, rectifier 36 to ground. Hence, the core will not be reset during the spaces between power pulses from source 30 and these power pulses will repeatedly drive the core to saturation and give a substantial current at the load.

The lower magnetic amplifier 63a of Figure 6 functions as a non-complementing magnetic amplifier the same as in connection with Figure 3, the only difference being that the polarity of all of the sources of current are reversed. During the state just mentioned, that is transistor 60 is conducting and transistor 61 is non-conducting, there will be no output from the upper magnetic amplifier for the reason that there will be a substantial drop through resistor 62 and therefore the wire 69c will be at nearly ground potential, which is substantially the same potential as the negative pole of battery 69e. Hence, no current will flow through coil 35 of the upper amplifier. During the spaces between power pulses current will flow from the positive pole of source 69g through resistor 33, coil 32, to the load and thus reset the core during the spaces between power pulses. Consequently, the power pulses from source 30 will find a high impedance in coil 32 and there will be very little current at the load.

If now a positive pulse is received at input 67 it will raise the potential at the emitter electrode 61a to a positive value and cause the transistor 61 to start conducting. Hence, there will be a large current flow through resistor 63 and wire 69d will rise in potential from the negative polarity of the upper end of battery 64 to substantially ground potential. This will cut off the flow of current through wire 69d to the coil 35 and will, through the feedback path 69b, cut off the flow of current in transistor 60, thus causing current to stop flowing in resistor 62. This will place wire 69c at a negative potential near to that of the negative side of battery 64, causing current to flow to battery 64 through the coil 35 of the upper magnetic amplifier 62a. Consequently, the upper magnetic amplifier 62a will no longer be cut off during the spaces between power pulses and subsequent power pulses from source 30 will find coil 32 having low impedance and current will flow to the load. The lower magnetic amplifier 63a, however, will have no output at the load for the reason that during the spaces between power pulses current will flow from positive pole 69h through the resistor 33, coil 32, rectifier 36 to ground, and thus reset the core during the spaces between power pulses. Subsequent power pulses will, therefore, meet with high impedance in the coil 32 and give no output at the load. A subsequent positive pulse at terminal 66 will cause the upper transistor 60 to become conducting and this action will bias the lower transistor 61 to cut-off, and the outputs of the two magnetic amplifiers will be reversed. Hence, following each signal pulse at input 66 there will be a train of output pulses in the load of the lower magnetic amplifier 63a and following each signalling pulse on input 67 there will be a train of pulses at the load of the upper magnetic amplifier 62a. When there is output from one of the magnetic amplifiers, the other is cut off.

It is well known in the prior art that transistors may be substituted for the triodes in the Eccles-Jordan flip-flop circuit, the details of such a substitution being fully disclosed at page 460 of the R. C. A. Review, vol. X, December 1949, No. 4. Consequently no novelty is claimed for the transistor flip-flop circuit per se; but novelty is claimed for the combination of that flip-flop circuit with one or more magnetic amplifiers connected as shown.

The batteries 69e and 69f have a small potential which opposes any current induced in the coil 35 due to the power pulses flowing through coil 32. However, the batteries 69e and 69f may not pass current to the wires 69c and 69d since rectifiers 62b and 63b are included in these circuits, which rectifiers are connected to oppose any such current flow.

Figure 7:
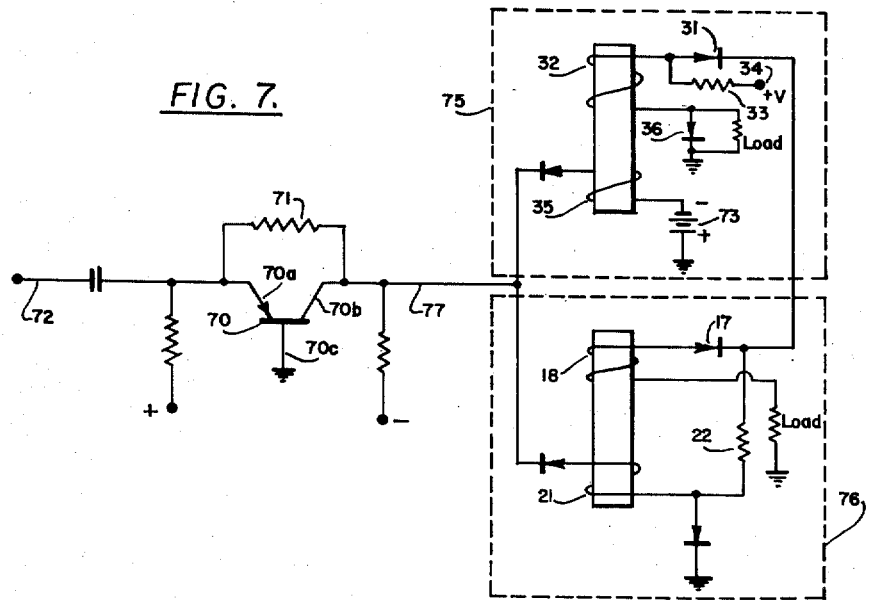
Figure 7 is a schematic diagram of another modified form of the invention.

Figure 7 illustrates a basic single-transistor bistable circuit including the transistor 70 with an emitter electrode 70a, a collector electrode 70b and a base electrode 70c. There is a positive feedback path 71 which gives bistable operation, as described in detail on page 466 of the R. C. A. Review of December 1949, supra. The transistor flip-flop circuit is fed by input signals at 72. The first one of a series of input signals at 72 causes the flip-flop circuit to give a transistor output current in wire 77 and the second input signal at 72 causes the transistor output current in wire 77 to stop. Similarly, the third input signal at 72 causes the transistor output current at 77 to again occur and the fourth input signal at 72 again causes cessation of transistor output current in the wire 77. The lead 77 controls the non-complementing magnetic amplifier 75 and the complementing magnetic amplifier 76. The details of the magnetic amplifier 75 are described in connection with Figure 3 while the details of the magnetic amplifier 76 are described in connection with Figure 1. When there is no signal on wire 77 there will be a continuous train of power pulses in the load of the magnetic amplifier 76. At this time there will be no output pulses in the load of the magnetic amplifier 75. However, when current ceases to flow in wire 77, the output pulses will appear at the load of the magnetic amplifier 75 and will not appear at the load of the magnetic amplifier 76. The battery 73 of Figure 7 performs substantially the same function as the battery 69f of Figure 6.

Figure 8:
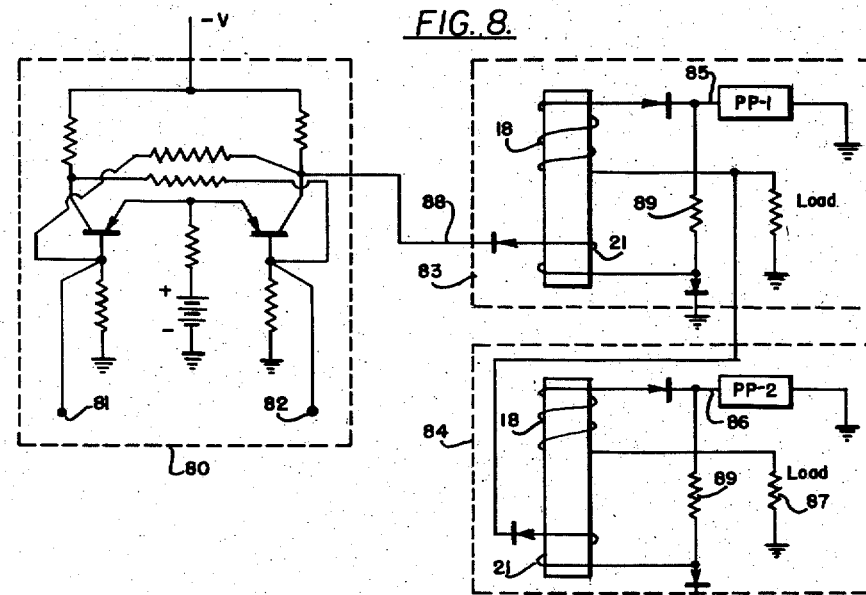
Figure 8 is a schematic diagram of still another modified form of the invention.

The device of Figure 8 has a transistor flip-flop circuit 80 similar to the transistor flip-flop circuit of Figure 6 except that the input leads 81 and 82 are connected to the base electrodes of the transistors instead of to the emitter electrodes. The signal pulses fed into input leads 81 and 82 are negative pulses in contrast to the positive pulses employed in connection with Figure 6. Transistor flip-flop circuit 80 is old and well known in the prior art and is not claimed herein except in combination with other elements.

Assuming that a negative pulse is first fed to input 81, the lefthand transistor becomes conducting and the wire 88 attains the potential of the negative source —V and consequently, current flows through the coil 21 of the complementing magnetic amplifier 83. The two magnetic amplifiers 83 and 84 are similar to the one described in connection with Figure 1 and are fed with power pulses at their input terminals 85 and 86. The relation of the power pulses fed to inputs 85 and 86 is the same as the power pulses fed from sources 30 and 16 of Figure 5, and therefore the timing diagram of Figure 5A applies to Figure 8 the same as to Figure 5. Therefore, when coil 21 is energized the train of power pulses from source PP-1, through wire 85 and coil 18 of magnetic amplifier 83, is interrupted and consequently there is no input to the coil 21 of magnetic amplifier 84. Since there is no input to the coil 21 of magnetic amplifier 84, there will be low impedance to flow of power pulses from source 86 to the load 87. Consequently it follows that after each energization of input 81 with a negative pulse, there will be an uninterrupted train of output pulses at the load 87. If a negative pulse now be fed to the input 82, it will start the righthand transistor, of the flip-flop circuit 80, conducting and therefore the potential on wire 88 will approach ground potential. Consequently, there will be no current flow in coil 21 of magnetic amplifier 83 and there will be low impedance in the coil 18 of the magnetic amplifier 83. Power pulses may then readily flow from the source 85 to the input coil 21 of the magnetic amplifier 84. This will reset the core of magnetic amplifier 84 during the spaces between the power pulses of source 85 and thereby cause the coil 18 to present high impedance to the flow of current to the load 87. Hence, there will be no substantial current flowing in the load 87. The resistors 89 cause a flow of blocking pulses from the sources 85 and 86 to flow through the coils 21, to counteract any voltage that is induced in these coils by the flow of power pulses through the coils 18. It will be noted that there is no novelty claimed in the present application for the transistor flip-flop circuit 80 nor for the two magnetic amplifiers 83 and 84 taken per se. However, patentable novelty is claimed for the combination of the transistor flip-flop circuit and one or more of the magnetic amplifiers by reason of the improved characteristics of the circuit taken as a whole.

Figure 9:
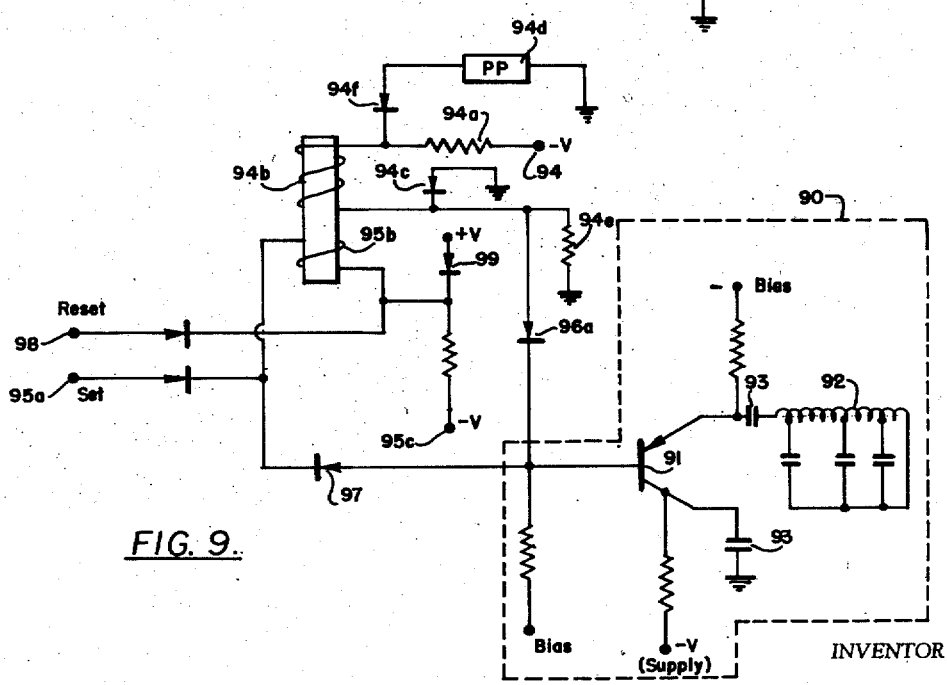
Figure 9 is a schematic diagram of yet another modified form of the invention.

In Figure 9, the device utilizes a transistor circuit 90 in which there is a transistor 91 connected to a delay delay line 92 which reflects any signal appearing in the transistor 91 and recreates a signal in the base electrode of the transistor in a given time after a triggering signal appeared at that base electrode. The transistor circuit includes blocking condensers 93 that serve only to isolate different portions of the circuit from each other. Normally current flows from ground to the negative pole of source 94 through resistor 94a, coil 94b and rectifier 94c thus resetting the core during the spaces between power pulses. Consequently, very little current normally flows from the source 94d through rectifier 94f, coil 94b to the load 94e. However, upon receipt of a pulse at the "set" input 95a, current then flows from input 95a through coil 95b to the negative pole 95c of a source of electricity. The current through coil 95b cancels the effect of the resetting current from source 94 during the spaces between power pulses. Hence, as shown in the timing diagram of Figure 9A, following a positive pulse at said input 95a the power pulses from source 94d will flow through the coil 94b to the load 94e. These pulses also flow through the rectifier 96a to the input or base electrode of the transistor 91. The potential appearing at the base electrode of the transistor is amplified and passed through the delay line 92 at the end of which it is reflected and returns through the transistor and thence through rectifier 97 back to the coil 95b.

It will be noted from the timing diagram of Figure 9A that the delay line 92 has the effect of delaying pulses from the load 94e by one space of time so that the reflected pulses appear during the spaces between power pulses instead of concurrently with the power pulses. In other words, the delay line 92 has, in each direction, a delay of approximately one-half the total delay required. Since the reflected pulses arrive at coil 95b during the spaces between power pulses, they continue to cancel the effect of the reset current which normally flows from battery 94 through coil 94b, and rectifier 94c. Hence, the apparatus continues to allow the power pulses from source 94d to flow to the load 94e without substantial impedance in coil 94b, since the core remains saturated. Consequently, power pulses will continue to be fed through rectifier 96a into the transistor circuit 90b where they will continue to be reflected; and from there they will continue to flow through rectifier 97 to the coil 95b where they will continue to flow to the negative pole 95c and thence to ground. Consequently there will be an uninterrupted train of output pulses at the load 94e. This stable state of the apparatus will continue until a "reset" pulse is received at input 98. Such a reset pulse is always timed to appear during one of the spaces between power pulses and it will raise the potential of the lower end of coil 95b to a positive value and therefore prevent any flow of current through that coil by reason of the reflected pulses. Hence, the current from negative pole 94 flowing through the coil 94b and rectifier 94c will again effect resetting of the core during the spaces between power pulses and thus cause the coil 94b to have high impedance to pulses from the source 94d. Hence, the current in the load 94e will be cut off. This state of affairs will continue because there will be no reflected pulses flowing through coil 95b and consequently the core will continue to be reset by the current from negative pole 94 flowing through the coil 94b. However, the next "set" input pulse at 95a will have the same effect as the first one and will again start an uninterrupted train of power pulses flowing to the load 94e.

The details of the transistor circuit 90 are described in Bell System Technical Journal, vol. XXVIII, pages 367 to 401, dated July 1949, and therefore need not be described here in detail.

The rectifier 99 has its anode connected to a source of positive potential and limits the potential which may be attained by the lower end of coil 95b. In other words, rectifier 99 acts simply as a limiter.

In Figure 10, the transistor 100 is normally conducting from ground through the emitter electrode 101 thence through the base electrode 100b, secondary coil 102 of the pulse transformer, and the biasing battery 104. This triggering current causes a current in the collector electrode 100a to flow through wire 105, rectifier 106, the coil 107 of the magnetic amplifier 108 and the source of power pulses 109, to ground. This current flowing through coil 107 resets the core during the spaces between power pulses, hence the power pulses from the source 109 meet with high impedance in the coil 107 and give very little output at the load 109a. If, however, a pulse appears at the "set" input 150, it will flow through the primary winding 151, resistor 152, battery 153, to ground. This will induce a pulse in the secondary 102 which will cancel momentarily the effect of bias battery 104 and stop the flow of emitter current through the emitter 101. Hence, the flow of current through wire 105 and coil 107 is cut off. Therefore, power pulses may now readily flow from the source 109 through the coil 107 which is now of low impedance, to the load 109a. These power pulses will also flow through the delay line 154, which delays each pulse until the space following that pulse, at which time each delayed pulse flows through rectifier 155, primary 151, resistor 152, and battery 153. This again induces a current in the secondary 102 which cancels the bias battery potential 104 momentarily and again cuts off the current in the emitter electrode 101, which again stops the flow of current in coil 107 and which again allows a power pulse to flow from source 109 to the load 109a. This power pulse flows through the delay line 154, the rectifier 155 and the primary winding 151, and the cycle repeats itself. Hence, the apparatus remains in one stable state of operation until one of the two reset inputs 156 or 157 is energized. While two rests 156 and 157 have been shown, either one may be omitted. Alternatively, both may be used and the reset effected by either. If a reset positive pulse is fed into input 157 during a space between two power pulses, it will cancel the delayed current flowing through coil 151 and prevent the pulse transformed from inducing current in coil 102. Thus there will be an output from the collector electrode 100a, which will flow through rectifier 106 and coil 107, and will reset the core between power pulses and prevent the next power pulse from source 109 from flowing through the coil 107 to the load. Since the power pulses have been cut off there will be no pulses flowing through the delay line 154 or the primary 151 and consequently current will continue to flow from the emitter electrode 101 through the coil 102 and the battery 104 and it will also continue to flow through the coil 107 resetting the core. This condition will prevail until the next set pulse is received at input 150.

The pulse transformer is of the usual type having a substantially squarewave output in response to each input pulse and therefore need not be described in any detail.

The device of Figure 11 has an advantage over ordinary transistor flip-flop circuits in that there is a large current multiplication as well as a large power gain. The circuit of Figure 11 operates as follows: Normally power pulses from source 110 tend to flow through rectifier 110a and the coil 110b of the magnetic amplifier to the load 110c. If there is no reset current, the power pulses from source 110 saturate the core and consequently there is low impedance in coil 110b and a large current in the load 110c. However, in the absence of current in the output of transistor 113 there is another path of current flow as follows: ground to rectifier 110e, coil 110b, resistor 110d, through the source 118 to ground. This flow of current will tend to reset the core during the spaces between power pulses and consequently there will be low output due to the power pulses at the load 110c. Moreover, the emitter electrode 113a is normally biased negatively through resistor 113c and therefore the transistor has an output current only when there is a large positive pulse impressed on the emitter electrode 113a.

If now a positive pulse is received at the set input 111, it will flow through resistor 112, the emitter electrode 113a of the transistor 113 and thence through the base electrode of this transistor to ground. This will cause the collector electrode 113b to pass current through the rectifier 117 to the upper end of the coil 110b and thus render the upper end of that core positive and prevent current from battery 118 from flowing through the coil 110b. Consequently the core will not be reset during the spaces between power pulses and power pulses of large amplitude will flow from the source 110 through the rectifier 110a, the coil 110b to the load 110c. Some of these power pulses will flow through the delay line 114 where they will be delayed by such an amount that they will appear during the space between power pulses and thus be the equivalent of a signal pulse. These delayed power pulses flow through rectifier 116, emitter electrode 113a, thence through the base electrode of the transistor 113 to ground. Consequently the delayed pulse will act the same as another set pulse and will again cause current to flow through the collector electrode 113b and rectifier 117 to again prevent the flow of a reset current from battery 118. Hence, power pulses continue to flow from the source 110 through the coil 110b to the load 110c and also through the delay line 114 which again causes a current flow in the emitter electrode 113a, and the cycle is repeated. Consequently the apparatus remains in the first stable state in which the source 110 is feeding large power pulses to the load 110c. This condition continues until a negative pulse is received at the reset input 115 during the space between two of the power pulses. Such a negative pulse causes the emitter electrode 113a to remain negative, notwithstanding the reflected positive pulse through the delay line 114, and consequently there is no transistor output current flowing through collector electrode 113b. Hence, there is no current to prevent the reset current of battery 118 from resetting the core. Therefore, the core is reset during the spaces between power pulses and the output at the load ceases. The next pulse appearing on set input 111 will have the same effect as the first one and will again start a flow of power pulses to the load 110c.

The circuit of Figure 12 has two sources of power pulses PP-1 and PP-2 which produce output potentials according to the two waveforms of Figure 5A. That is, source PP-1 produces pulses during the spaces between the pulses of source PP-2, and vice versa. Assume that in the starting condition of the apparatus the source PP-1 is passing pulses through the coil 120, there being no resetting current in that coil, so that the power pulses saturate the core and flow through rectifier 126 to the load 127. These pulses also flow through rectifier 121 and emitter electrode 122 of the transistor 123. Consequently current flows in the collector electrode 124 through diode 125 and coil 120a of the second magnetic amplifier, and thence through source PP-2 to ground. This current flow occurs during the spaces between the power pulses of source PP-2 and therefore resets the second core during the spaces between the power pulses PP-2. Hence, the power pulses PP-2 find the core unsaturated and therefore the coil 120a has high impedance and there is very little output through rectifier 126a to the load 127a. Hence, there is very little current in the emitter electrode 122a and consequently very little output from the collector electrode 124a of the transistor 123a. This state will continue until a pulse appears at the second input 128a. Such a positive pulse will flow through rectifier 129a, emitter electrode 122a of the transistor 123a and thence to ground. This will cause the transistor 123a to become conducting and current will flow through its collector electrode 124a and rectifier 125a to the coil 120 and thence through the source of power pulses PP-1 to ground. Since these currents flow during the spaces between power pulses of source PP-1, they will reset the core during the spaces between power pulses and hence the coil 120 will have high impedance to the power pulses and very little current will then flow through rectifier 121 and emitter electrode 122. Consequently the current at collector electrode 124 will stop and there will be no reset current through the coil 120a. Consequently pulses from the source PP-2 readily flow through coil 120a, rectifier 121a, emitter electrode 122a of transistor 123a to ground. This will continue to produce pulses in electrode 124a which will flow through rectifier 125a and coil 120, through source of power pulses PP-1 to ground. Consequently the core of coil 120 will be repeatedly reset during the spaces between power pulses of source PP-1, but the core of coil 120a will not be reset during the spaces between the power pulses of source PP-2. This results in no output in the load 127, but an uninterrupted train of output pulses in the load 127a. This state will continue until a positive input pulse is received at input 128 which will flow through rectifier 129, emitter electrodes 122 of transistor 123 to ground. This will cause an output on the collector electrode 124 which will flow through rectifier 125 and reset the core of coil 120a during a space between power pulses of source PP-2. Consequently the output at load 127a will be stopped and there will be no current flowing through rectifier 121a and emitter electrode 122a to ground. Hence, the output of collector electrode 124a will cease and the core of coil 120 will not be reset during the spaces between the power pulses of source PP-1 and consequently power pulses from that source may readily flow through coil 120 to the load 127 and also through rectifier 121 to the emitter electrode 122 of transistor 123 to ground. This will cause additional pulses to flow through collector electrode 124 and rectifier 125 to the coil 120a and thus continue to reset the core of coil 120a during the spaces between the power pulses of PP-2. This stable state of affairs will continue until another pulse is received at the second input 128a which will have the same effect as the previous pulse on that input. It follows that an input pulse at the first input will cause an uninterrupted train of output pulses at the first load which will continue until a pulse is received at the second input which will cause current to stop flowing to the first load and start an uninterrupted train of output pulses at the second load. This stable state of operation will continue until another pulse is received at the first input which will again cause the apparatus to produce an uninterrupted train of output pulses at the first output and stop the flow of pulses to the second output.

The device of Figure 13 is a counter circuit of the type often used in electronic computers and it employs a non-complementing amplifier of the type shown in Figure 3. Similar reference numerals on Figures 3 and 13 illustrate similar parts.

At the start of the apparatus it may be assumed that current will tend to flow from source of power pulses 30 through the rectifier 31, coil 32, to the load 140. However, the core will be reset between power pulses and therefore the coil 32 will have high impedance and there will be very little current actually reaching the load 140. The resetting current flows during the spaces between power pulses from ground to the negative pole 34 through resistor 33, coil 32, rectifier 36. A coil 35 is employed to cancel the reset current whenever coil 35 is energized. A source of blocking potential 139 tends to pass a current through coil 130 but this current may not flow due to the fact that rectifier 128 is connected in the direction to prevent such flow. The function of battery 139 is to oppose any voltage induced in coil 35 due to the flow of power pulses through coil 32.

When the first positive pulse appears at "step" input generator 130, it will flow through rectifier 131, resistor 132, emitter electrode 133 of the transistor 134 and thence through the base electrode 134a through resistor 135 and battery 136 to ground. This will cause a flow of current in the collector electrode 137 which passes through rectifier 138 and coil 35 to the negative terminal of battery 139 and thence through 139 to ground. The changes of flux in the core produced by the application of positive power pulses to winding 32 will induce in winding 35 a voltage opposing that of battery 139; but diode 138 is so poled that, even if these induced voltages should exceed the potential of battery 139, no current can flow as a result. When the power pulse goes negative and current flows from ground through 36, 32, and 33 to 34, a voltage will tend to be induced in 35 which will add to the voltage of battery 139; but this is the proper polarity for the transistor 134 to operate as described, and is therefore not objectionable. Thus, there is a current in the coil 35 which cancels the reset current in coil 32 during the spaces between power pulses. Hence, the coil 32 will have low impedance to the next power pulse from source 30 which will flow through the coil 32 to the load 140. It will also flow through rectifier 141 and delay line 142 which will delay it for a sufficient time that it will appear at the output of the delay line in the space between power pulses which follows the pulse entering the delay line. It will then flow through rectifier 143 and resistor 132 to the emitter electrode 133 and thus cause a further output current in the collector electrode 137 which will again flow through the coil 35 and again cancel the reset current. Consequently the next power pulse from source 30 will again find the coil 32 having low impedance and the next pulse from the source 30 will flow to the load 140 and also through the rectifier 141 and the delay line 142; and the cycle of operations will repeat. Hence, the device is operating in one of its two stable states.

During the first step input pulse there was no output from the delay line 142 and consequently the upper end of resistor 147 was at substantially ground potential. The reason for this was that current was flowing from battery 144 through resistor 145, rectifier 146, resistor 147, and battery 148. The drop across resistor 145 is substantially equal to that of battery 144 and the drop across resistor 147 was substantially equal to the potential of battery 148. Hence the wire W, representing hte output lead of the gate was at substantially ground potential. It remained at this potential even though a positive pulse appears from the step input 130 and raised the upper end of resistor 147a to a positive value. Consequently the only path of flow of the first step input pulse from source 130 was through the rectifier 131 to the resistor 132. However, once the apparatus began to operate in its first stable state the gate connected to the step input is in a different condition and will respond in a different way to the second step input pulse due to the fact that pulses are appearing from the output of the delay line 142 during the spaces between power pulses and are raising the potential of the upper end of resistor 147 to a positive value. Since the step input pulses from source 130 always occur during the spaces between power pulses of source 30, the upper end of resistor 147a will be raised to a high positive value during the period when the second pulse appears at the step input 130. This means that since the second step input pulse raises the upper end of resistor 147a to a high positive value, the full potential of battery 144 is then impressed through resistor 145 upon the base electrode 134a of the transistor 134. Consequently the operation of the second step input pulse from source 130 may be summarized by stating that it raises the base electrode 134a of the transistor 134 to a positive value and thus cuts off that transistor and prevents further flow of current from the collector electrode 137 through the coil 135. Hence the core is reset during the spaces between power pulses by virtue of the negative potential 34. It follows that the coil 32 will then have high impedance to the pulses from source 30 and any current to the load 140 will be cut off. This condition will remain until the third step input pulse arrives at source 130 whereupon the same chain of events will result as followed the first step input pulse. Likewise the fourth step input pulse will have the same effect as the second one.

Consequently the operation of the counter circuit may be summarized by stating that following the first step input pulse from source 130 there will be an uninterrupted train of power pulses in the load 140 which will continue until the second step input pulse at 130 appears. This second step input pulse will cut off the flow of current to the load 140 and it will remain off until the third step input pulse is received which will restore the uninterrupted train of power pulses at the load 140. This train of power pulses will continue until the fourth step input pulse cuts them off, etc.

The rectifier L acts as a limiter to prevent the wire W from ever acquiring a negative potential.

Figure 14 shows a combination of magnetic amplifiers like that of Figure 3 with a two-transistor counter circuit suitable for high speed operation. Similar reference numbers on Figures 3 and 14 designate similar parts in circuits that function in the same way. The common feedback path between the transistors 151a and 151b, is resistor 150. If transistor 151a is conducting, currents will flow into its emitter and into its base, and out through its collector. The base current flowing through resistor 143a (and rectifier 144a or coil 145a) will cause the base electrode to be below ground potential, but the base potential fall will be limited by the flow of current through resistor 146a and rectifier 147a, which will occur if the base falls below the potential of the junction of resistors 146a and 148a. The resistances and voltages are so proportioned that the potential of the base and the currents through the transistor are limited in amplitude, and the length of time required to stop the current flow when (by a positive pulse passing from input 141 through condenser 142a and rectifier 147a to the base of transistor 151a) the base of transistor 151a is made positive will, according to the known art, be reduced as compared with the time required to stop the current if a larger current had been permitted to flow (i. e., if the negative voltage excursion of the base of transistor 151a had not been limited as described hereinabove). During the time that transistor 151a is conducting, the current drawn through resistor 150 will cause the emitters of transistors 151a and 151b to be at a potential below ground, so that no current will flow from the emitter of 151b to its base, which will be at or slightly above ground potential. A positive pulse applied at input 141, passing through condenser 142a and rectifier 147a will stop current flow through transistor 151a by raising the potential of its base. This positive pulse will see the path 145a—143a as a high impedance because coil 145a will be a high reactance and rectifier 144a will be poled against it, so that the incoming pulse will be only slightly absorbed by the path 145a—143a. The buildup of current through resistor 143b will not meet any high impedance because rectifier 144b is properly poled to allow current to flow readily through to the base of transistor 151b. Now, when transistor 151a was conducting, the flow of current through resistor 149a caused the common junction of 148a and 149a to be more positive than if transistor 151a were turned off; and because resistor 148a is joined with resistor 146a, their junction will also be more positive with transistor 151a conducting. Thus when the input pulse from input 141 passes through condensers 142a and 142b, while it produces equal voltage changes in both circuits, it will raise the base of transistor 151a to a higher absolute voltage than that of the base of transistor 151b, so that the current flowing through resistor 150 will flow through the emitter of transistor 151b and make that transistor conduct. The situation then is as above described except that the parts with postscript "b" function as did those with postscript "a" in the preceding description and vice versa. Diodes 152a and 152b are so poled, together with windings 35 that a negative input will produce a positive output from the magnetic amplifier. Thus if transistor 151a is not conducting, its collector potential will become negative and will cause the amplifier connected to it to produce positive outputs; and similarly for transistor 151b and its associated amplifier. Thus it appears that successive positive pulses applied to input 141 will cause the two magnetic amplifiers to alternate in providing outputs, thus fulfilling the function of binary counting.

It is well known that prior art transistor bistable systems have a steady feeble output current in one stable state and no output current in the other stable state. The present invention has an improved result in that there is an uninterrupted train of pulses, each of considerable power and involving a large current flow, when the system is in one stable state. In the other stable state no current flows, but by suitable modification some other steady output could represent the second steady state. Another advantage is gained in that the output pulses are timed and shaped. Moreover, the system may be designed to be receptive to signal input pulses only at predetermined time intervals.

I claim to have invented:

1. In combination, a transistor having emitter, collector and base electrodes; a circuit connected to the emitter and base electrodes for applying control signals to the transistor; and a magnetic amplifier comprising a saturable core, winding means on the core, means for applying a series of spaced power pulses to at least a portion of the winding means which will effect saturation of the core unless the latter is reset during the spaces between power pulses, and means for selectively resetting the core during the spaces between power pulses including a connection between said collector electrode and said winding means so that the flow of current from the collector electrode through at least a portion of the winding means determines whether or not the core is reset during the spaces between power pulses.

2. In combination, a transistor having emitter, collector and base electrodes; means connected to the emitter and base electrodes for applying input potentials thereto whereby to control flow of current in the collector electrode; a magnetic amplifier comprising a saturable core, coil means on the core, a source of spaced power pulses for feeding current through at least a portion of said coil means and which drives the core to saturation unless the core is reset during the spaces between power pulses; and reset means connected to said coil means for normally resetting the core during the spaces between power pulses; and means for connecting the collector electrode to the coil means so as to neutralize the effect of the reset means when current flows through the collector electrode.

3. In combination, a transistor having emitter, collector and base electrodes; a circuit connected to the emitter and base electrodes for applying control signals to the transistor whereby to control the flow of current in the collector electrode; a magnetic amplifier comprising a saturable core, coil means on the core, and a source of spaced power pulses for feeding current through at least a portion of the coil means and which drives the core to saturation unless the core is reset during the spaces between power pulses; and means so connecting the collector electrode to the coil means that current through the collector electrode will reset the core during spaces between power pulses and thereby prevent saturation of the core.

4. In combination, a transistor having emitter, collector and base electrodes; a magnetic amplifier comprising a saturable core, coil means on the core, a source of spaced power pulses for feeding at least a portion of the coil means and which will drive the core to saturation unless the core is reset during the spaces between power pulses, and means connecting the collector electrode to the coil means to control the resetting of the core according to the current through the collector electrode; input means; and means connected to the input means and to the emitter and base electrodes of the transistor for flipping the system from one stable state to another stable state.

5. The combination of claim 4 in which the last-named means includes a feedback path for receiving power pulses that pass through the coil means and feeding such pulses to the transistor so that when the system is in a stable state that produces output pulses from the coil means those output pulses are fed back to the transistor and so control it that the collector electrode then so controls the magnetic amplifier that the latter continues to produce said output pulses.

6. In combination, an input; a transistor having emitter, collector and base electrodes; means so connecting the input to the emitter and base electrodes that a first input pulse will change the collector current from a first to a second value and a second input pulse will change the collector current back to the first value; a magnetic amplifier comprising a saturable core, coil means on the core, a source of spaced power pulses feeding at least a portion of the coil means and which will saturate the core unless the latter is reset during the spaces between power pulses; and means connecting the collector electrode to at least a part of said coil means to control the resetting of the core during the spaces between power pulses according to the magnitude of the collector current.

7. The combination of claim 6 in which said magnetic amplifier is of the non-complementing type wherein the last-named means includes resetting means connected to the coil means, the last-named means also including means which neutralizes the effect of the resetting means when the current through the collector electrode has one of said values and which does not effect resetting of the core when the current through the collector electrode has the other of said values.

8. The combination of claim 6 in which the last-named means effects resetting of the core by the current flowing through the collector electrode when the current has the greater of said two values.

9. In combination, first and second transistors each having emitter, collector and base electrodes; input means; means connecting the input means in circuit with the emitter and base electrodes of the transistors and connecting the collector electrode of each transistor to the base electrode of the other one so that the transistors act as a flip-flop circuit triggered by said input means; a magnetic amplifier comprising a saturable core, coil means on the core, and a source of spaced power pulses feeding at least a part of the coil means and which will saturate the core unless the core is reset during the spaces between power pulses; and control means connecting the first collector electrode to said coil means to control the resetting of the core according to the current flowing through the collector means.

10. The combination of claim 9 in which said magnetic amplifier includes resetting means for normally resetting the core during the spaces between power pulses; the control means neutralizing the effect of the resetting means when substantial current flows through the first collector means.

11. The combination of claim 10 in which there is a second magnetic amplifier which is the same as the first-named one; and additional control means so connecting the second collector electrode to the coil means of the second magnetic amplifier as to cancel the effect of the resetting means of the second magnetic amplifier when current flows through the second collector electrode.

12. The combination of claim 9 in which the control means resets the core during the spaces between power pulses when the current flowing through the first collector electrode exceeds a given value by passing such current through at least a portion of said coil means.

13. The combination of claim 12 including a second magnetic amplifier comprising all of the following parts: a saturable core, coil means on the core, a second source of power pulses the pulses of which are timed to occur during the spaces between the pulses of the first source, and means for transmitting the pulses that started from the first source and passed through the coil means of the first magnetic amplifier to the coil means of the second magnetic amplifier to reset the core of the latter amplifier during the spaces between pulses of the second source when the coil means of the first magnetic amplifier presents low impedance to the flow of power pulses from the first source.

14. In combination, a transistor bistable circuit having a single transistor, said transistor having an input circuit including emitter and base electrodes and an output circuit including a collector electrode, input means, and control means connecting the input means to said input circuit and also connected to the collector electrode whereby the circuit has two stable states one of which is characterized by a current flow through the collector electrode and the other one of which is characterized by absence of current flow through the collector electrode, the last-named means including means for flipping the bistable circuit from one stable state to the other and vice versa according to energization of the input means; a magnetic amplifier comprising a saturable core, coil means on the core, a source of spaced power pulses for passing current through said coil means and which will effect saturation of the core unless it is reset during the spaces between power pulses, and resetting means for normally resetting the core during the spaces between power pulses; and means so connecting the collector electrode of the transistor to the coil means as to neutralize the effect of the resetting means when current flows through the collector means.

15. The combination of claim 14 in which there is a second magnetic amplifier comprising all of the following parts: a saturable core, coil means on the core, a second source of spaced power pulses the pulses of which occur during the spaces between pulses of the first source, said second source feeding current through the coil means of the second amplifier and saturating the second core unless the latter is reset during the spaces between pulses, and means transmitting the pulses of the first source which passed through the coil means of the first magnetic amplifier to the coil means of the second magnetic amplifier to reset the core of the second magnetic amplifier when the coil means of the first magnetic amplifier has low impedance.

16. The combination of claim 15 in which the input means includes two input terminals, said control means including all of the following: a rectifier for allowing positive pulses from one of said terminals to flow to the base electrode of the transistor and a second rectifier for allowing negative pulses from the other terminal to flow to said base electrode, a main power source for the transistor having positive and negative poles, a resistor connecting the negative pole to said collector electrode, means for grounding the positive pole, another resistor one end of which is connected to the base electrode, means for biasing the other end of the last-named resistor positively above ground, and means connecting the emitter electrode to ground.

17. The combination of claim 14 in which the input means includes input terminals, said control means including all of the following: a rectifier for allowing positive pulses from one of said terminals to flow to the base electrode of the transistor and a second rectifier for allowing negative pulses from the other terminal to flow to said base electrode, a main power source for the transistor having positive and negative poles, a resistor connecting the negative pole to said collector electrode, means for grounding the positive pole, another resistor one end of which is connected to the base electrode, means for biasing the other end of the last-named resistor positively above ground, and means connecting the emitter electrode to ground.

18. In combination, a transistor flip-flop circuit having a collector electrode through which current flows when the flip-flop circuit is in one stable state, there being an absence of current flow through said collector electrode in the other stable state; a source of spaced power pulses; a non-complementing magnetic amplifier controlled by the current flow through said collector electrode, said non-complementing amplifier comprising a saturable core, coil means on said core at least a part of which is energized by pulsed current flow from said source, the power pulses driving the core to saturation unless the core is reset during the spaces between power pulses, means connected to said coil means for normally resetting the core during the spaces between power pulses, and means connecting said collector electrode to said coil means to neutralize the effect of the resetting means when there is current flowing through the collector electrode; and a complementing magnetic amplifier comprising a saturable core, coil means on said core at least a part of which is energized by pulsed current flow from said source, the power pulses driving this second core to saturation unless the core is reset during the spaces between power pulses, and means connecting said collector electrode to the coil means of the complementing magnetic amplifier to reset the core during the spaces between power pulses when current flows through the collector electrode.

19. The combination of claim 18 in which the transistor flip-flop circuit comprises all of the following: a transistor having emitter and base electrodes and said collector electrode, a source of negative potential relative to said base electrode, a resistor connecting said negative source to said collector electrode, means for biasing the emitter electrode negatively relative to the base electrode, means for applying the signal pulses to the transistor circuit by rendering the emitter electrode positive relative to the base electrode in response to signal pulses, and feedback means including a resistor connecting the collector and emitter electrodes for maintaining a current through the collector electrode until the next signal pulse appears, once such current flows through the collector electrode is started.

20. In combination, a transistor having an input including emitter and base electrodes and an output including a collector electrode, a pulse transformer having a primary and a secondary, bias means so controlling the input of the transistor through said secondary that the transistor is normally conducting, a magnetic amplifier having a saturable core and coil means on the core, a source of spaced power pulses for normally effecting current flow through at least a part of the coil means and which will drive the core to saturation unless the core is reset during the spaces between power pulses, means connecting the collector electrode and the coil means for resetting the core during the spaces between power pulses when there is an output current flowing through the collector electrode, feedback means including a delay element for transmitting the pulses from said source which passed through the coil means to said primary so that there will be two stable states of operation in one of which a power pulse will flow through the coil means while the core is saturated and be delayed until the space following that power pulse when it will flow through said primary and induce a potential in said secondary that will neutralize the bias on the input of the transistor and thus terrupt the output current from the transistor and thereby prevent resetting of the core during the space between power pulses, the other stable state being characterized by a continuous output current from the transistor which resets the core during the spaces between power pulses, and means including set and reset inputs connected to said feedback means for shifting from one to the other of said stable states and vice versa.

21. In combination, a transistor having an input including emitter and base electrodes and an output including a collector electrode, means for biasing the input of the transistor so that normally there is no output therefrom, a magnetic amplifier including a saturable core and a coil on the core, a source of spaced power pulses for feeding current through said coil to saturate the core unless the core is reset during the spaces between power pulses, means for normally resetting the core during the spaces during power pulses, means for neutralizing the effect of said resetting means when current flows in the output of the transistor, and feedback means including a delay element for receiving the pulses from said source after they have passed through said coil means and delaying them so that they appear during the spaces between the pulses of said source and applying the delayed pulses to the input of the transistor so as to effect output pulses from the transistor in accordance with the delayed pulses, and input means connected to the feedback means for determining whether or not feedback exists through the feedback means.

22. In combination, first and second magnetic amplifiers each of which includes means for producing an uninterrupted train of output pulses when there is no control current applied to the amplifier and which has no substantial output when control current is applied to the input thereof, first and second sources of spaced power pulses for respectively supplying power to said magnetic amplifiers, each of said sources producing its pulses during the spaces between the pulses of the other source, first and second transistors each having an input including emitter and base electrodes and an output including a collector electrode, means connecting the collector electrode of the first transistor so it supplies control current for the second magnetic amplifier, means connecting the collector electrode of the second transistor so it supplies control current for the first magnetic amplifier, means applying the output pulses of the second magnetic amplifier to the input of the second transistor so that the second transistor will supply control current to the first magnetic amplifier to cut it off when there are output pulses from the second magnetic amplifier, means applying the output pulses of the first magnetic amplifier to the input of the first transistor so that the first transistor will supply control current to the second magnetic amplifier to cut it off when there are output pulses from the first magnetic amplifier, and first and second inputs respectively connected to the inputs of said first and second transistors.

23. In combination, first and second sources of spaced power pulses in which the pulses of each source occur during the spaces between pulses of the other source, first and second magnetic amplifiers respectively supplied with power by said first and second sources, each of said amplifiers having an output and an input including means whereby the presence of an input current during the spaces between power pulses cuts off the output current, first and second transistors each having an input including emitter and base electrodes and an output including a collector electrode, means connecting the outputs of the first and second amplifiers to the inputs of the first and second transistors respectively and the outputs of the first and second transistors to the inputs of the second and first amplifiers respectively whereby there are two stable states of operation in the first of which the first amplifier has an output and in the second of which the second amplifier has an output, and means for selecting either of said stable states comprising input means connected to the inputs of said transistors.

24. In a counting circuit, a transistor having an input including emitter and base electrodes and an output including a collector electrode, a magnetic amplifier comprising a saturable core with coil means on the core, a source of spaced power pulses for passing current through at least a part of said coil means to saturate the core unless the core is reset during the spaces between power pulses, means connected to said coil means to normally effect resetting of the core during the spaces between power pulses, means for neutralizing the effect of the resetting means during the spaces between power pulses when there is a current in the output of the transistor, feedback means including a delay element for transmitting those power pulses that pass through the coil means to the input of the transistor and for delaying these pulses so that they arrive at the transistor during the spaces between power pulses and thereby produce output pulses from the transistor which prevent resetting of the core, whereby there is a first stable state of operation in which there is an uninterrupted train of output pulses and whereby interruption of the feedback currents results in a second stable state characterized by the absence of an output, a step input which feeds the input of the transistor to start the apparatus operating in said first stable state, and a gate connected to the output of the delay element and to the step input and which biases the transistor input to cut off output from the transistor when pulses simultaneously appear at the step input and at the output of the delay element.

25. In combination, a magnetic amplifier comprising a saturable core with coil means thereon, a source of spaced power pulses for passing current through at least a portion of said coil means to saturate the core unless the latter is reset during the spaces between power pulses, means for normally resetting the core during the spaces between power pulses, a control winding for neutralizing the effect of the resetting means, a transistor having emitter and base electrodes and a collector electrode, means including a source of negative potential connected to the collector electrode and having a high resistance connected between the source and the collector electrode, means for transmitting current that passes from said source of power pulses through said coil means to the base electrode of the transistor to control the latter, a delay line connected at one end to the emitter electrode and acting as a reflector at its other end so that when a power pulse passes through the coil means it energizes the base electrode of the transmitter and thus causes current flow through the emitter electrode and hence starts a pulse down the delay line which is reflected back and appears during the space between power pulses and thereupon causes an amplified delayed pulse to flow in the transistor, feedback means connecting the transistor to said control winding so that the amplified delayed pulse will prevent resetting of the core, a set input for applying a pulse to the control winding to start flow of current through the feedback path, and a reset input for interrupting flow of current in the feedback path.

26. In combination; a magnetic amplifier comprising a saturable core, coil means on the core, a source of spaced power pulses for passing pulses through at least a part of the coil means unless the core is reset during the spaces between power pulses; an input; a transistor; and means connecting the input, the transistor and the magnetic amplifier so that they act as a flip-flop circuit with the output current from the transistor controlling the resetting of said core.

27. In combination; a magnetic amplifier comprising a saturable core, coil means on the core, and a source of spaced power pulses for passing pulses through at least a part of said coil means to drive the core to saturation unless it is reset during the spaces between power pulses; feedback means for receiving any of the pulses that pass through the coil means and delaying them and applying them to control the resetting of the core during the spaces between the spaces between power pulses, said feedback means including a transistor for amplifying the potential applied to control the resetting of the core; and input means connected to the feedback means to effect flip-flop operation of the apparatus.

28. In combination; a magnetic amplifier comprising a saturable core, coil means on the core, and a source of spaced power pulses for passing pulses through at least a part of the coil means to saturate the core unless it is reset during the spaces between power pulses; an input; and means controlled by said input and including a transistor which controls the resetting of said core.

29. The combination of claim 28 in which the last-named means is also controlled by the pulse energy flowing through the coil means and includes delay means whereby the apparatus acts as a flip-flop circuit.

30. In a circuit for producing a pulse output; a magnetic amplifier having a saturable core, coil means on the core, and a source of spaced power pulses for passing pulses through at least a part of the coil means to saturate the core unless it is reset during the spaces between power pulses; and means controlling the resetting of the core during the spaces between power pulses including a transistor the current flow through which controls the resetting of the core.

31. In combination; a magnetic amplifier having a saturable core, coil means on the core, and a source of spaced power pulses connected to the coil means for passing sufficient pulsed current through at least a portion of the coil means to saturate the core unless the core is reset during the spaces between power pulses; and means, including a transistor in series with at least a part of said coil means, to control the resetting of the core depending on whether or not current flows through the transistor to said coil means.

32. The combination of claim 31 in which the last-named means includes resetting means which normally resets the core during the spaces between power pulses, and means which receives current from the transistor for neutralizing the effect of the resetting means.

33. The combination of claim 31 in which the last-named means controls the resetting of the core by passing current from the transistor directly through at least a portion of the coil means to thereby effect resetting of the core.

34. The combination of claim 1 including means for limiting the magnitude of current through the transistor so that it will cease conduction with minimal delay under predetermined circumstances responsive to an input signal.

35. In combination, a step input, first and second transistor circuits including means whereby they alternately become conducting in response to a series of input pulses at the step input, means for limiting the magnitudes of the currents through the transistors so each will respectively cease conduction with minimal delay when a step input is applied that will start the other one conducting, and two magnetic amplifiers respectively controlled by the outputs of the two transistors.

References Cited in the file of this patent

UNITED STATES PATENTS 2,695,993     Haynes _____ Nov. 3, 1954

UNITED STATES PATENT OFFICE

CERTIFICATE OF CORRECTION

Patent No. 2,798,169                                July 2, 1957

John Presper Eckert, Jr.

It is hereby certified that error appears in the printed specification of the above numbered patent requiring correction and that the said Letters Patent should read as corrected below.

Column 20, line 25, strike out "between the spaces".

Signed and sealed this 24th day of September 1957.

(SEAL)
Attest:

KARL H. AXLINE
Attesting Officer

ROBERT C. WATSON
Commissioner of Patents